United States Patent
Monty et al.

[11] Patent Number: 6,035,023
[45] Date of Patent: Mar. 7, 2000

[54] METHOD AND APPARATUS FOR CONTROLLING THE RECEIVE STATE OF A FACSIMILE HAVING A DOWNSTREAM CONNECTED TELEPHONE

[75] Inventors: Melissa Monty; Paul Albitz, both of San Diego, Calif.

[73] Assignee: Hewlett-Packard Company, Palo Alto, Calif.

[21] Appl. No.: 09/107,981

[22] Filed: Jun. 30, 1998

[51] Int. Cl.$^7$ .................................................. H04M 11/00
[52] U.S. Cl. ............................... 379/100.15; 379/100.06; 358/400
[58] Field of Search ......................... 379/100.01, 100.03, 379/100.05, 100.09, 100.12, 100.15, 100.17, 354–356, 93.08; 358/400, 434–438, 442, 468

[56] References Cited

U.S. PATENT DOCUMENTS

| | | | |
|---|---|---|---|
| 4,833,705 | 5/1989 | Kobayashi | 379/100.14 |
| 4,908,851 | 3/1990 | Kotani et al. | 379/100 |
| 5,038,226 | 8/1991 | Nagaishi | 379/100.06 |
| 5,146,489 | 9/1992 | Telibasa | 379/100 |
| 5,153,912 | 10/1992 | Sakakibara et al. | 379/100 |
| 5,317,629 | 5/1994 | Watanabe | 379/100.15 |

FOREIGN PATENT DOCUMENTS 1-303855  12/1989  Japan ................................ 379/100.17

*Primary Examiner*—Wing F. Chan

[57] ABSTRACT

A facsimile communication system includes a facsimile which is provided with an automatic document feeder (ADF), a Start key, a downstream-connected telephone and a manual receive mode where a user, upon hearing a facsimile signal, can press the Start key and commence a facsimile receive action. A processor present in the facsimile is responsive to the detection of (i) a ring signal from a remote communication device, and (ii) a document present in the ADF, followed by (iii) an actuation of the Start key and (iv) detection of an incoming facsimile signal (i.e., a CNG signal), to initiate a facsimile receive action. Accordingly, even though a document is located in the ADF and the Start key has been actuated, the facsimile's transmission action is inhibited. This action also occurs, even if the downstream telephone is in the off-hook state.

3 Claims, 2 Drawing Sheets

METHOD AND APPARATUS FOR CONTROLLING THE RECEIVE STATE OF A FACSIMILE HAVING A DOWNSTREAM CONNECTED TELEPHONE

FIELD OF THE INVENTION

This invention relates to control of a facsimile having a downstream telephone connected to the same incoming line which receives facsimile signals and, more particularly, to a method and apparatus for enabling the facsimile to enter a facsimile receive mode, even when a document is positioned in an automatic document feeder thereof and a Start key has been actuated.

BACKGROUND OF THE INVENTION

Currently, many facsimile installations include both a facsimile and a telephone, both of which are coupled to a common public switched network telephone line. The prior art includes many teachings regarding methods for discriminating between incoming facsimile messages and incoming telephone calls. For instance, U.S. Pat. No. 4,908,851 to Kotani et al. describes a system wherein a facsimile and a telephone are connected to a common telephone line. The facsimile at the called location includes a detector for detecting a facsimile request signal which occurs within a present time of an incoming ring signal. If such a facsimile signal is detected, the facsimile apparatus is connected to the telephone line. Otherwise, the incoming call is put through to the telephone as being other than a facsimile signal.

U.S. Pat. No. 5,146,489 to Telibasa describes a device for controlling flow of data between a single incoming telephone line and either a facsimile machine or a telephone handset. The device detects an incoming call and, depending upon whether an incoming facsimile signal is detected or not, routes the signal to either the facsimile machine or the telephone, as the case may be.

U.S. Pat. No. 5,153,912 to Sakakibara describes a facsimile system wherein actuation of a Start key to commence a facsimile transmission is unnecessary. More particularly, if the facsimile control function detects that facsimile data is ready for transmission, a switching device disconnects a commonly connected telephone and connects the facsimile to the telephone line, without requiring any operator actuation of the Start key.

Notwithstanding such teachings in the prior art, a problem has been detected which occurs because the facsimile send function and the facsimile receive function are often configured and controlled by a single key on the control panel of the facsimile, i.e., the Start key. The problem surfaces when a user is trying to receive a facsimile call in the manual mode (i.e., the receiving facsimile is not to set up to answer facsimile handshake signals automatically), and a document is positioned in an automatic document feeder coupled to the facsimile. If the user does not remove the document in the automatic document feeder before pressing the Start key to commence a receive action, the local facsimile will respond to the actuation of the Start key by trying to send the document, rather than trying to receive the incoming facsimile. In this condition, both communicating facsimiles send CNG tones and neither is in a listening mode. Accordingly, neither a facsimile reception nor a facsimile transmission is achieved.

Currently, facsimiles that are configured in the manual receive mode employ a logic chain to cause the facsimile to initiate a facsimile send action. More particularly, the send action occurs when:

(1) the downstream telephone is off-hook,
(2) a document is loaded in the automatic document feeder, and
(3) the user presses the Start key.

Accordingly, the facsimile is set up to initiate the facsimile send action of the document that is in the automatic document feeder when the Start key is pressed. However, the user may not have intended that the document to be sent as a facsimile at this time. For instance, the user might intend to copy the document, or the document might be a facsimile that is scheduled to be sent at a later time.

One potential solution to the above-indicated ambiguity is to place the facsimile send and facsimile receive functions on different keys. However, well-established standards for design of facsimiles require the initiation of either function by actuation of a single Start key. As users are accustomed to such single key functionality, the dual key solution is undesirable.

Accordingly, it is an object of this invention to provide an improved method and apparatus for controlling a facsimile that is configured with a downstream telephone, to respond to an incoming facsimile signal, even when a document is loaded in the facsimile's automatic document feeder.

It is another object of this invention to provide a method and apparatus for controlling a facsimile to respond to an incoming facsimile signal when a Start key is depressed and a document is present in the facsimile's automatic document feeder.

SUMMARY OF THE INVENTION

A facsimile communication system includes a facsimile which is provided with an automatic document feeder (ADF), a Start key, a downstream-connected telephone and a manual receive mode where a user, upon hearing a facsimile signal, can press the Start key and commence a facsimile receive action. A processor present in the facsimile is responsive to the detection of (i) a ring signal from a remote communication device, and (ii) a document present in the ADF, followed by (iii) an actuation of the Start key and (iv) detection of an incoming facsimile signal (e.g. a CNG signal), to initiate a facsimile receive action. Accordingly, even though a document is located in the ADF and the Start key has been actuated, the facsimile's transmission action is inhibited. This action also occurs, even if the downstream telephone is in the off-hook state.

DETAILED DESCRIPTION OF THE INVENTION

Figure 1:
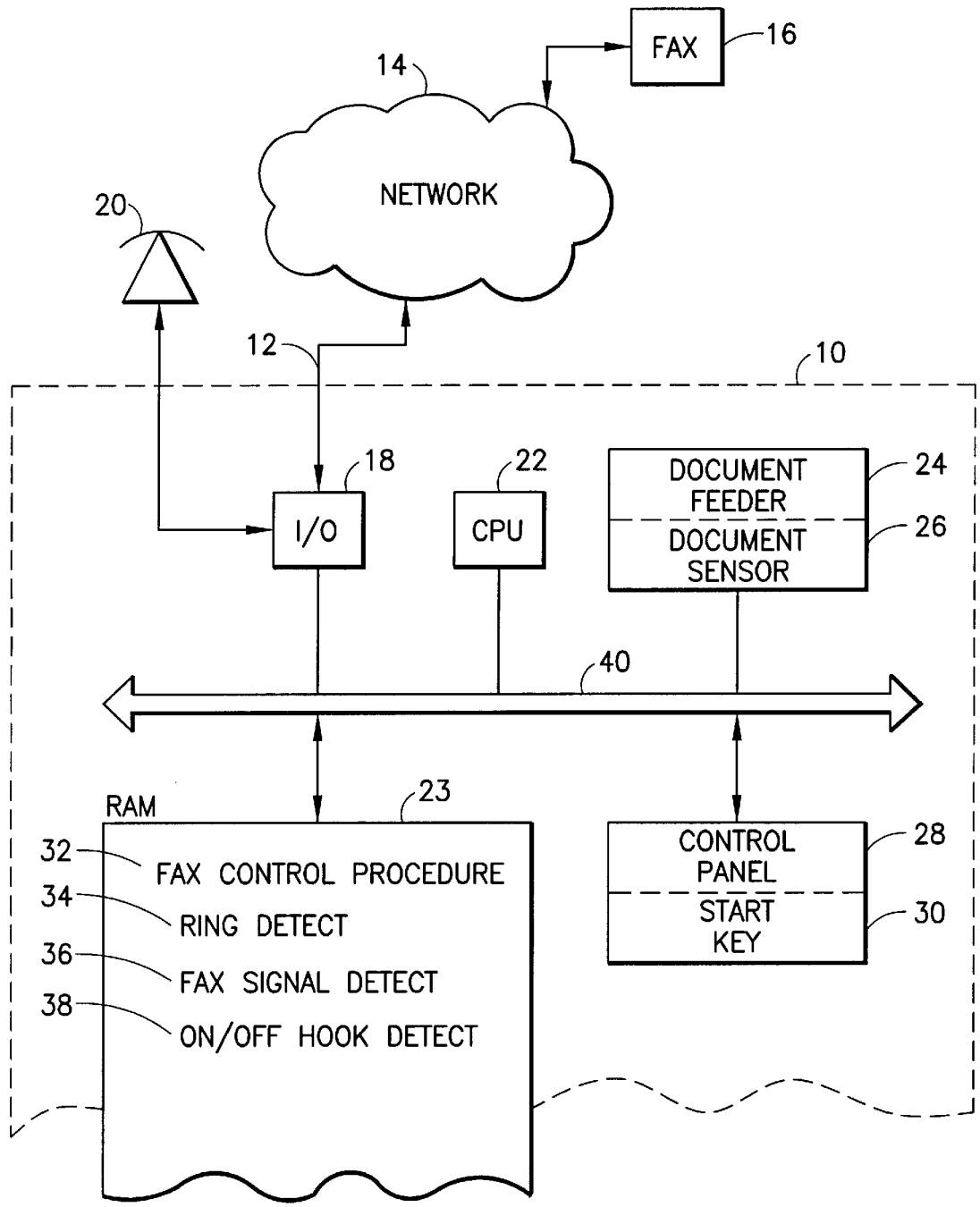
FIG. 1 is a block diagram of a facsimile system embodying the invention hereof.

A facsimile 10 is connected via a telephone line 12 and a network 14, to one or more of a plurality of facsimiles 16. Communications received over network 14 and telephone line 12 are handled by an input/output module 18, which module 18 is also connected to a downstream telephone 20.

Also included within facsimile 10 is a central processing unit (CPU) 22 which, in conjunction with procedures and parameters in random access memory (RAM) 23 control the operation of facsimile 10. A document feeder 24 includes a document detector 26 which senses the presence of a document to be transmitted therein. A control panel 28, includes a plurality of keys, displays, etc. that are utilized to enable user-control of facsimile 10. A Start key 30 is positioned on control panel 28 and enables the initiation of both facsimile transmission and facsimile reception actions. Each of the aforesaid elements of facsimile 10 communicate via a bus system 40.

Random access memory 23 stores a facsimile control procedure 32 which implements a number of subprocedures, i.e., a ring detect procedure 34, a facsimile signal detect procedure 36 and an on/off hook detection procedure 38. On/off hook detection procedure 38 detects whether downstream telephone 20 is on-hook or off-hook.

As will be recalled, facsimile 10 and downstream telephone 20 are both connected to network 14 via telephone line 12. Accordingly, in prior art configurations, when a ring signal was detected by ring detect procedure 34, facsimile 10 would only respond to actuation of Start key 30 and automatically institute a receive action if on/off hook detection procedure 38 determined that telephone 20 was off-hook (indicating that a user had lifted the receiver of telephone 20). Under such conditions, if a document was loaded in document feeder 24 (and detected by document detector 26), facsimile 10 would, in response to actuation of Start key 30, automatically institute a manual facsimile/send procedure, irrespective of whether an incoming facsimile signal had been detected. On the other hand, if downstream telephone was still on-hook, no facsimile/send procedure would be commenced.

As indicated above, the prior art solutions could result in accidental initiation of a facsimile/send action when the user's intention was to initiate a receive of an incoming facsimile call. It has been determined that if facsimile control procedure 32 is modified to include certain additional logical steps, this erroneous operation can be avoided.

Figure 2:
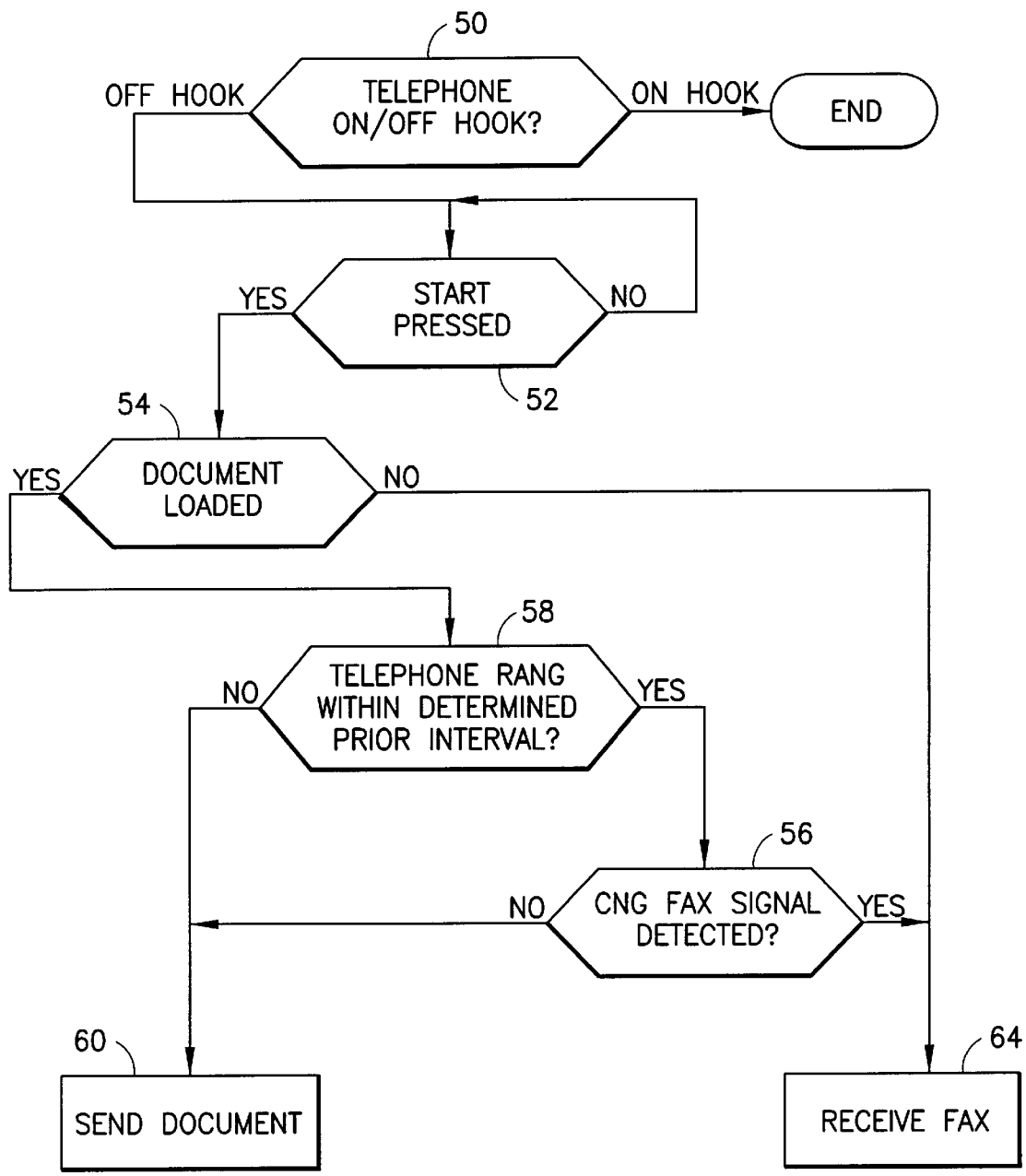
FIG. 2 is a logical flow diagram of the method of the invention.

Referring to FIG. 2, the method of the invention is illustrated by the flow diagram shown therein. In essence, the illustrated logic indicates that if facsimile 10 keeps track of the fact that telephone 20 has just rung, that that information can be utilized to enable a choice to be made of an appropriate function to initiate when the user thereafter actuates Start key 30, even if a document is present in automatic document feeder 24.

More specifically, the procedure of a first embodiment of the invention commences by initially determining if downstream telephone 20 is off-hook (i.e., a user has lifted the phone receiver off-hook) (decision step 50). If no, the procedure is at an end. If yes, the method of the invention next determines if the Start key 30 has been pressed (decision step 52). If no, the procedure recycles and awaits a further action.

If yes, the procedure next determines if a document has been loaded in ADF 24 (decision step 54). This action is accomplished by facsimile control procedure 32 sensing an output signal from document detector 26, indicating the presence of a media sheet in ADF 24.

If there is no document loaded in ADF 24, then the procedure moves to step 64 and commences receiving the incoming facsimile. If a document is determined to be loaded in ADF 24, the procedure moves to decision step 58 to determine whether a telephone ring signal was detected by ring detect procedure 34 within a determined prior interval. If not, facsimile 10 is controlled by facsimile control procedure 32 to transmit the document in ADF 24 (step 60).

If it is determined that the telephone did ring within the determined prior interval (decision step 58), the procedure moves to determine whether a CNG facsimile signal has been detected by facsimile signal detect procedure 36 (decision step 56). If no, the procedure enables the document in document feeder 24 to be transmitted (step 60). If yes, a receive facsimile procedure is enabled by facsimile control procedure 32 (step 64). Accordingly, starting with the detection of (i) the downstream telephone being off hook, followed by a determination that (ii) the Start key has been actuated; (iii) a document is loaded and (iv) that the telephone just rang, the procedure next (iv) determines whether or not a CNG facsimile signal is detected. Upon such detection, the receive facsimile action is enabled in lieu of a document transmission action.

Note that while FIG. 2 illustrates a sequence of decision steps, i.e., 50, 52, 54, 56 and 58, the illustrated sequence can be altered, while still achieving the same result. Further, the method of the invention can be revised to support initiation of a manual facsimile receive action even when downstream telephone 20 is not off-hook. In the revised embodiment of the invention, by just tracking whether a ring signal has occurred, facsimile machine 10 is enabled to initiate an appropriate response, i.e., a facsimile receive action, even when a document is loaded in ADF 24. Under such circumstances, the procedure shown in FIG. 2 is modified by eliminating decision step 50 and commencing the procedure at decision step 52.

Pseudo code descriptions of both embodiments can be written as follows:

---

First Embodiment:

```
if the downstream telephone is off-hook
        and the user presses START and a document is loaded
        if the telephone just rang
                if facsimile signals are detected (CNG)
                        then initiate a manual facsimile receive
                else
                        initiate a facsimile send with the document in the
                        ADF
else
        do not respond to telephone ringing.
```

---

Second Embodiment:

```
if the user presses START
        and a document is loaded
        if the telephone just rang
                if facsimile signals are detected (CNG)
                        then initiate a manual facsimile receive
                else
                        initiate a facsimile send with the document in the
                        ADF
else
        do not respond to telephone ringing.
```

---

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A facsimile communication system for communicating with other communication devices via a single telephone circuit, comprising:
   a facsimile including an automatic document feeder (ADF), and a START key;
   a telephone connected to said facsimile, both said facsimile and said telephone coupled to said single telephone circuit; and
   processor means for implementing a manual receive mode and responsive to detection of (i) a ring signal from a remote communication device and said telephone being off-hook, and (ii) a document sensed in said ADF, (iii) an actuation of said START key and (iv) detection of an incoming facsimile signal, to initiate a facsimile receive action by said facsimile communication system, in lieu of a facsimile transmission action of said document.

2. The facsimile communication system as recited in claim 1, wherein said processor means only commences said facsimile receive action, if said ring signal is detected by said processor means within a determined period of time prior to sensing said facsimile signal.

3. A method for controlling a facsimile machine wherein a document is sensed in an automatic document feeder (ADF), and wherein said facsimile machine includes a START key and is coupled to a downstream telephone receiver, said method comprising the steps of:
   a) detecting an incoming ring signal and said telephone being off-hook;
   b) detecting an actuation of said START key within a determined time interval after said incoming ring signal; and
   c) detecting an incoming facsimile signal; and
   d) responding to steps a), b) and c) by activating a facsimile receive action, notwithstanding a presence of said document in said ADF.

\* \* \* \* \*